US012598018B2

(12) United States Patent
Liao et al.

(10) Patent No.: US 12,598,018 B2
(45) Date of Patent: Apr. 7, 2026

(54) METHOD FOR MITIGATING INTERFERENCE FROM COEXISTING OFDM-BASED RADIO ACCESS TECHNOLOGIES

(71) Applicant: MEDIATEK INC., Hsinchu City (TW)

(72) Inventors: Pei-Kai Liao, Hsinchu City (TW); Mohamed Abdelrazek El-Saidny, Dubai (AE)

(73) Assignee: MEDIATEK INC., Hsinchu City (TW)

( * ) Notice: Subject to any disclaimer, the term of this patent is extended or adjusted under 35 U.S.C. 154(b) by 385 days.

(21) Appl. No.: 17/998,029

(22) PCT Filed: May 6, 2021

(86) PCT No.: PCT/CN2021/091923
§ 371 (c)(1),
(2) Date: Nov. 5, 2022

(87) PCT Pub. No.: WO2021/223712
PCT Pub. Date: Nov. 11, 2021

(65) Prior Publication Data
US 2023/0179317 A1     Jun. 8, 2023

Related U.S. Application Data

(60) Provisional application No. 63/040,030, filed on Jun. 17, 2020, provisional application No. 63/020,578, filed on May 6, 2020.

(51) Int. Cl.
*H04L 5/00*     (2006.01)
*H04J 11/00*     (2006.01)

(52) U.S. Cl.
CPC .......... *H04J 11/005* (2013.01); *H04L 5/0048* (2013.01)

(58) Field of Classification Search
CPC ....... H04B 1/123; H04J 11/005; H04L 5/0048
See application file for complete search history.

(56) References Cited

U.S. PATENT DOCUMENTS

| | | |
|---|---|---|
| 10,103,832 B2 | 10/2018 | Kouttismanis |
| 11,490,379 B2 | 11/2022 | Maaref et al. |

(Continued)

FOREIGN PATENT DOCUMENTS

| | | |
|---|---|---|
| CN | 103581073 A | 2/2014 |
| CN | 103701478 A | 4/2014 |

(Continued)

OTHER PUBLICATIONS

Chinese language office action dated Jul. 20, 2023, issued in application No. CN 202180032706.4.

(Continued)

*Primary Examiner* — Mansour Oveissi
(74) *Attorney, Agent, or Firm* — McClure, Qualey & Rodack, LLP

(57)     ABSTRACT

A method, applied to a UE, to mitigate interference for coexistence of OFDM-based radio access technologies, wherein the method includes receiving a dedicated RRC signal providing LTE CRS configuration information of neighboring LTE cells in one or more LTE carriers and providing the corresponding frequency location and bandwidth of the LTE carriers for an NR serving cell, wherein NR and LTE coexist in the same spectrum; determining the LTE CRS configuration and the corresponding frequency location of LTE CRS based on the received dedicated RRC signal; and performing LTE CRS interference suppression or cancellation in NR downlink (DL) transmission.

11 Claims, 5 Drawing Sheets

Receiving a dedicated RRC signal providing LTE CRS configuration information of neighboring LTE cells in one or more LTE carriers and providing corresponding frequency location and bandwidth of the LTE carriers for an NR serving cell, NR and LTE coexists in the same spectrum — S300

Determining LTE CRS configuration and corresponding frequency location of LTE CRS based on the received dedicated RRC signal — S302

Performing LTE CRS interference suppression or cancellation in NR DL transmission — S304

(56)                    References Cited

U.S. PATENT DOCUMENTS

2014/0086371  A1      3/2014  Li et al.
2015/0016331  A1      1/2015  Kim et al.
2015/0103683  A1      4/2015  Kim et al.
2018/0070369  A1      3/2018  Papasakellariou
2018/0254797  A1      9/2018  Amini et al.
2020/0014481  A1      1/2020  Chervyakov
2021/0058953  A1*     2/2021  Bendlin ................ H04W 16/14
2021/0092662  A1*     3/2021  Takahashi ........... H04W 72/541
2022/0312452  A1*     9/2022  Frenne ................... H04L 5/005

FOREIGN PATENT DOCUMENTS

CN          104995863  A      10/2015
CN          105659659  A       6/2016
CN          110115102  A       8/2019
EP          3 471 332  A1      4/2019
EP          3 905 840  A2     11/2021
WO          2018127074 A1      7/2018

OTHER PUBLICATIONS

International Search Report and Written Opinion dated Jul. 23, 2021, issued in application No. PCT/CN2021/091923.
Chinese language office action dated Mar. 22, 2024, issued in application No. CN 202180032706.4.
Extended European Search Report dated May 3, 2024, issued in application No. EP 21799863.2.

* cited by examiner

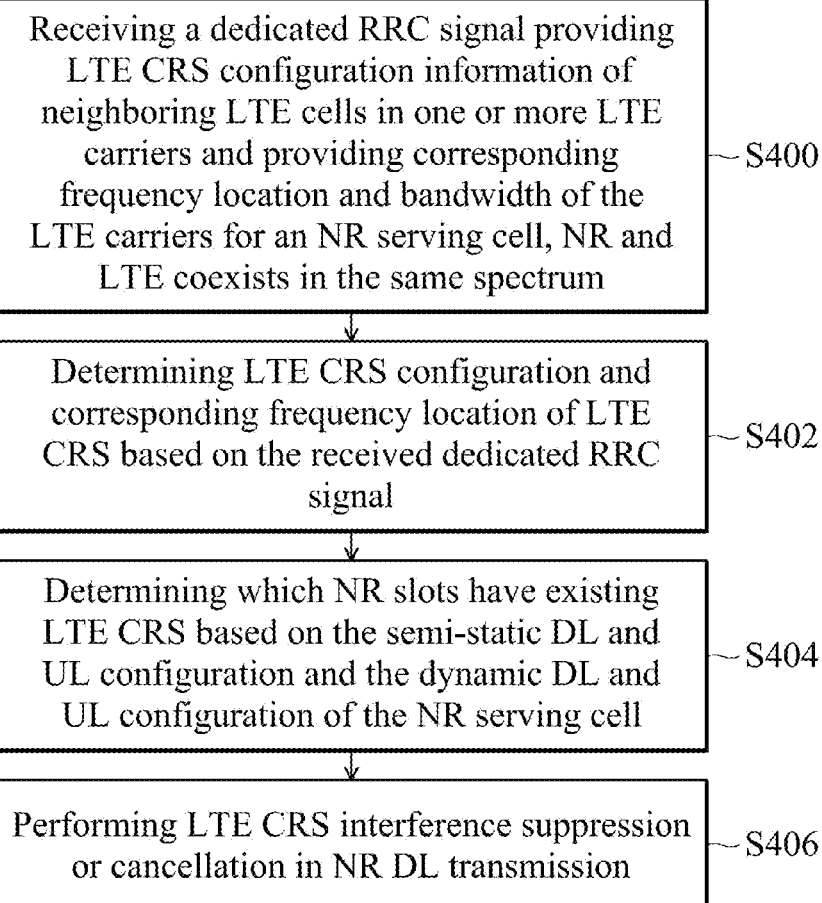

Receiving a dedicated RRC signal providing LTE CRS configuration information of neighboring LTE cells in one or more LTE carriers and providing corresponding frequency location and bandwidth of the LTE carriers for an NR serving cell, NR and LTE coexists in the same spectrum ~S400

Determining LTE CRS configuration and corresponding frequency location of LTE CRS based on the received dedicated RRC signal ~S402

Determining which NR slots have existing LTE CRS based on the semi-static DL and UL configuration and the dynamic DL and UL configuration of the NR serving cell ~S404

Performing LTE CRS interference suppression or cancellation in NR DL transmission ~S406

FIG. 4

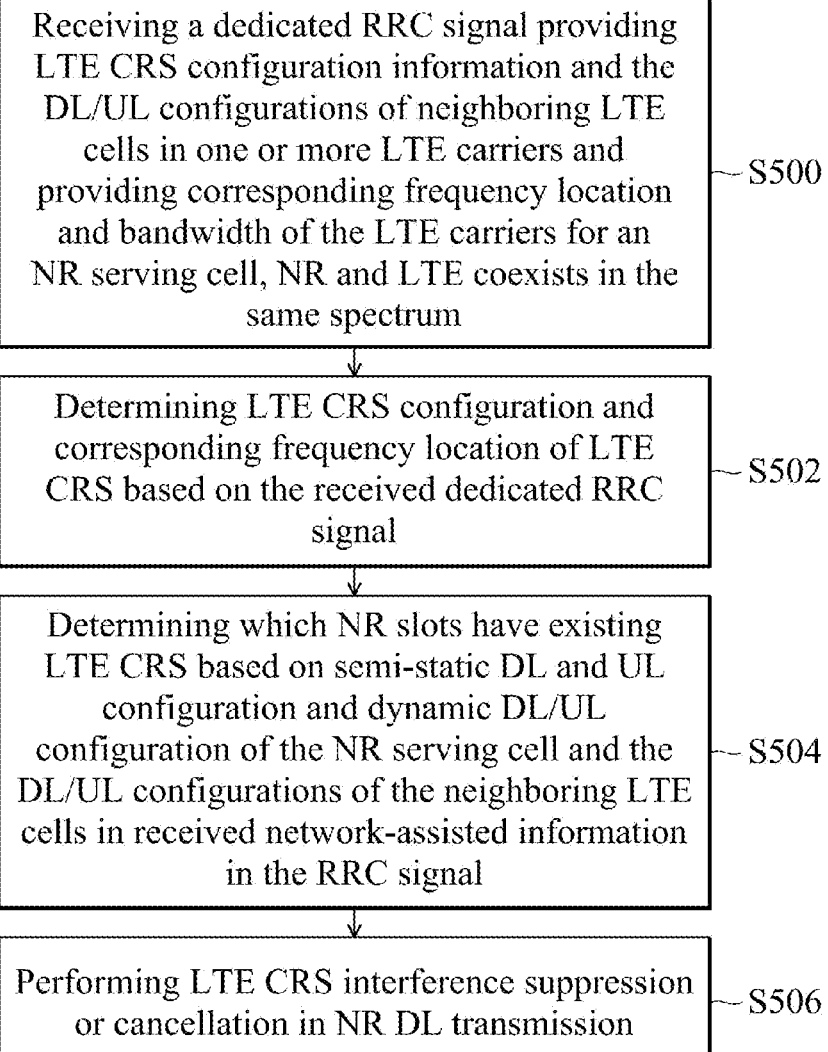

Receiving a dedicated RRC signal providing LTE CRS configuration information and the DL/UL configurations of neighboring LTE cells in one or more LTE carriers and providing corresponding frequency location and bandwidth of the LTE carriers for an NR serving cell, NR and LTE coexists in the same spectrum ~ S500

Determining LTE CRS configuration and corresponding frequency location of LTE CRS based on the received dedicated RRC signal ~ S502

Determining which NR slots have existing LTE CRS based on semi-static DL and UL configuration and dynamic DL/UL configuration of the NR serving cell and the DL/UL configurations of the neighboring LTE cells in received network-assisted information in the RRC signal ~ S504

Performing LTE CRS interference suppression or cancellation in NR DL transmission ~ S506

FIG. 5

METHOD FOR MITIGATING INTERFERENCE FROM COEXISTING OFDM-BASED RADIO ACCESS TECHNOLOGIES

CROSS REFERENCE TO RELATED APPLICATIONS

This application claims priority of and the benefit of U.S. Provisional Applications No. 63/020,578, filed on May 6, 2020, and No. 63/040,030, filed on Jun. 17, 2020, the entirety of which is incorporated by reference herein.

FIELD OF THE DISCLOSURE

The disclosure is related to an interference mitigation method, and in particular it is related to a method for mitigating interference from coexisting OFDM-based radio access technologies.

DESCRIPTION OF THE RELATED ART

3GPP Rel-15 5G-NR supports the coexistence of LTE and NR in the same spectrum, for dynamic spectrum sharing. There is high-density common reference signal transmission in LTE DL, i.e. a cell-specific reference signal (CRS), even when there is no DL data transmission, whereas there is no such high-density common reference signal transmission in NR DL. Without CRS, NR suffers from less inter-cell interference though it introduces higher complexity for UE to maintain synchronization with a serving gNB. To combat CRS interference, CRS interference suppression/cancellation is introduced in LTE.

However, when NR coexists with LTE in the same spectrum, there is interference from LTE CRS to NR PDSCH between cells in DL. Since there is no CRS interference suppression/cancellation support in NR yet, deploying NR in LTE spectrum for dynamic spectrum sharing doesn't provide better user throughput, compared to LTE. According to one evaluation result, NR throughput degrades by 10-20%, compared to NR without such interference.

BRIEF SUMMARY OF THE DISCLOSURE

In order to resolve the issue described above, the present disclosure provides a method to mitigate interference for coexistence of OFDM-based radio access technologies. The method is applied to a UE. The method includes receiving a dedicated radio resource control (RRC) signal providing Long Term Evolution (LTE) cell-specific reference signal (CRS) configuration information about neighboring LTE cells in one or more LTE carriers and providing the corresponding frequency location and bandwidth of the LTE carriers for a New Radio (NR) serving cell, wherein NR and LTE coexist in the same spectrum; determining the LTE CRS configuration and the corresponding frequency location of LTE CRS based on the received dedicated RRC signal; and performing LTE CRS interference suppression or cancellation in NR downlink (DL) transmission.

According to the method disclosed above, the NR DL transmission is achieved by using frequency-division duplex (FDD).

According to the method disclosed above, the LTE CRS configuration information includes physical-layer cell identification, the number of LTE CRS antenna ports, and the multicast broadcast signal frequency network (MBSFN) sub frame configuration.

According to the method disclosed above, the method further includes determining which NR slots have existing LTE CRS based on the semi-static DL and UL configuration and the dynamic DL and UL configuration of the NR serving cell.

According to the method disclosed above, the semi-static DL and UL configuration is provided via higher-layer signaling, and the dynamic DL and UL configuration is provided via physical-layer signaling.

According to the method disclosed above, the NR DL transmission is achieved by using time-division duplex (TDD).

According to the method disclosed above, the method further includes receiving the RRC signal providing the DL and UL configuration of each LTE carriers, wherein there are one or more neighboring LTE cells sharing the same DL and UL configuration in each LTE carrier; and determining which NR slots have existing LTE CRS based on the semi-static DL and UL configuration and the dynamic DL and UL configuration of the NR serving cell and the DL and UL configurations of the neighboring LTE cells in the received network-assisted information in the RRC signal.

According to the method disclosed above, the semi-static DL and UL configuration is provided via higher-layer signaling, and the dynamic DL and UL configuration is provided via physical-layer signaling.

According to the method disclosed above, the NR DL transmission is achieved by using TDD.

According to the method disclosed above, the LTE CRS configuration information comprises physical-layer cell identification, the number of LTE CRS antenna ports, and the MBSFN sub frame configuration.

BRIEF DESCRIPTION OF THE DRAWINGS

The disclosure can be more fully understood by reading the subsequent detailed description with references made to the accompanying figures. It should be understood that the figures are not drawn to scale in accordance with standard practice in the industry. In fact, it is allowed to arbitrarily enlarge or reduce the size of components for clear illustration. This means that many special details, relationships and methods are disclosed to provide a complete understanding of the disclosure.

FIG. 4 is a flow chart of a method to mitigate interference for coexistence of OFDM-based radio access technologies in TDD spectrum in accordance with some embodiments of the disclosure.

FIG. 5 is a flow chart of a method to mitigate interference for coexistence of OFDM-based radio access technologies in TDD spectrum in accordance with some embodiments of the disclosure.

DETAILED DESCRIPTION OF THE DISCLOSURE

In order to make the above purposes, features, and advantages of some embodiments of the present disclosure more comprehensible, the following is a detailed description in conjunction with the accompanying drawing.

It is understood that the words "comprise" and include used in the present disclosure are used to indicate the existence of specific technical features, values, method steps, operations, units and/or components. However, it does not exclude that more technical features, numerical values, method steps, work processes, units, components, or any combination of the above can be added.

The words "first", "second", "third", "fourth", "fifth", and "sixth" are used to describe components, they are not used to indicate the priority order of or advance relationship, but only to distinguish components with the same name.

Figure 1:
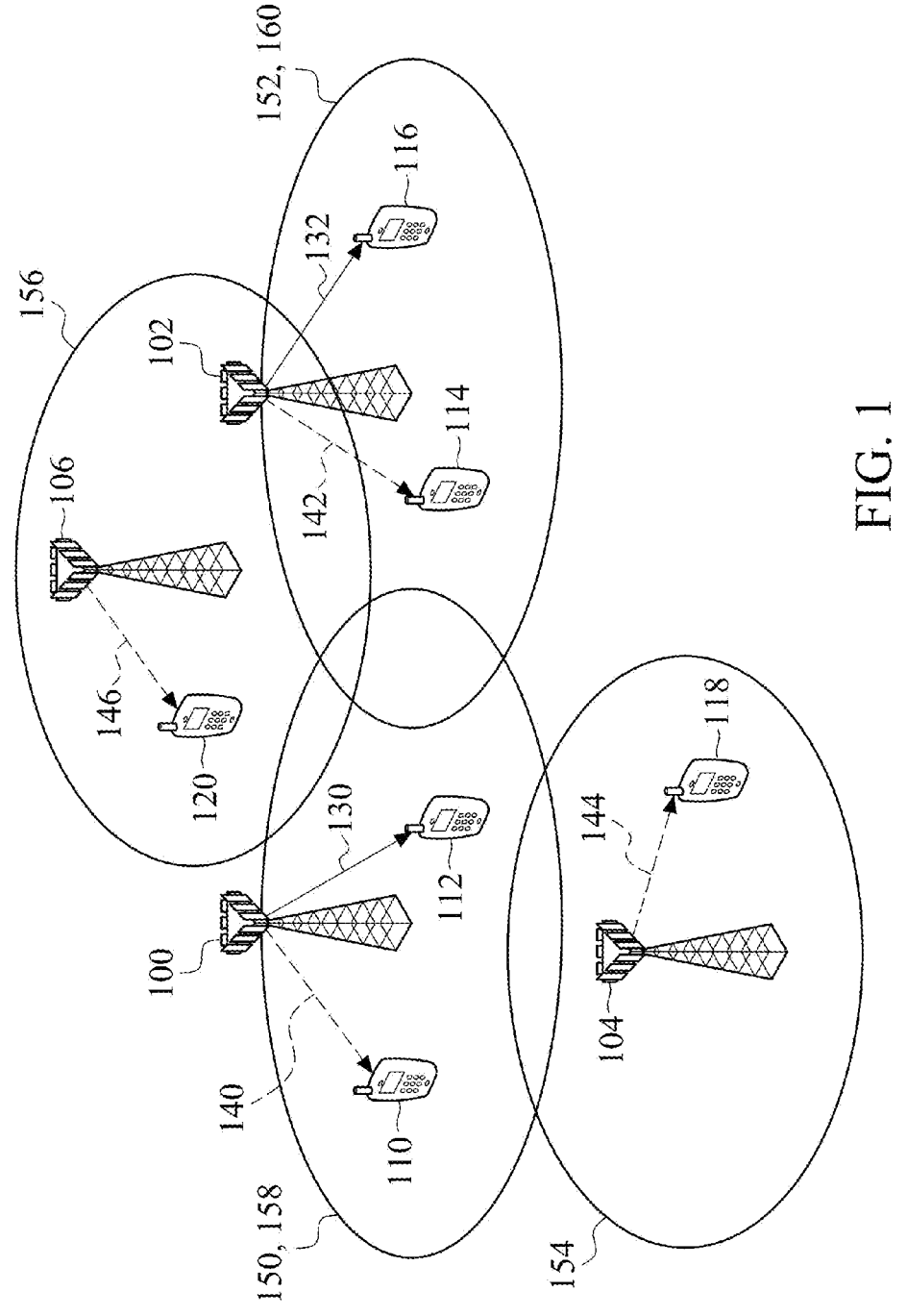
FIG. 1 is a schematic diagram of a scene of coexistence of NR and LTE in accordance with some embodiments of the disclosure.

FIG. 1 is a schematic diagram of a scene of coexistence of NR and LTE in accordance with some embodiments of the disclosure. As shown in FIG. 1, the scene in FIG. 1 includes a base station 100, a base station 102, a base station 104, a base station 106, a UE 110, a UE 112, a UE 114, a UE 116, a UE 118, and a UE 120. In some embodiments, the base stations 100 and 102 support both New Radio (NR) and Long Term Evolution (LTE). For example, the base stations 100 and 102 can be both gNB and eNB, but the present disclosure is not limited thereto.

In detail, the UE 110 in a cell 150 is connected with the base station 100 by Radio Resource Control (RRC) signaling on an LTE carrier 140. The UE 112 in a cell 158 is connected with the base station 100 by RRC signaling on an NR carrier 130. The UE 114 in a cell 152 is connected with the base station 102 by RRC signaling on an LTE carrier 142. The UE 116 in a cell 160 is connected with the base station 102 by RRC signaling on an NR carrier 132. In FIG. 1, cell 150 completely overlapscell 158, and cell 152 completely overlapscell 160, but the present disclosure is not limited thereto.

In some embodiments, the base stations 104 and 106 support LTE. For example, the base stations 104 and 106 can be eNB, but the present disclosure is not limited thereto. In detail, the UE 118 in a cell 154 is connected with base station 104 by RRC signaling on an LTE carrier 144. The UE in a cell 156 is connected with base station 106 by RRC signaling on an LTE carrier 144. Since the UE 110 and the UE 112 are both connected with the base station 100, the base station 100 may send LTE cell-specific reference signal (CRS) configuration information of the serving cell (such as cell 150) to the UE 112 by Physical Downlink Shared Channel (PDSCH) in the NR carrier 130, so that the UE 112 can obtain frequency location of LTE CRS in cell 150.

In some embodiments, taking the base station 100 and the UE 112 as examples, the base station 100 in cell 158 may obtain LTE CRS configuration information of the neighboring LTE cells (for example, the cells 152, 154 and 156) from the base stations 102, 104, and 106, and then sends the LTE CRS configuration information of the neighboring LTE cells to the UE 112. Therefore, when NR and LTE are in the same spectrum, the UE 112 may receive a dedicated RRC signal providing LTE CRS configuration information of neighboring LTE cells (for example, the cells 152, 154 and 156) in one or more LTE carriers (for example, the LTE carriers 142, 144, and 146) and providing the corresponding frequency location and bandwidth of the LTE carriers for the NR serving cell (for example, cell 158).

After that, the UE 112 may determine the LTE CRS configuration and the corresponding frequency location of LTE CRS based on the received dedicated RRC signal. Since the UE 112 not only obtains the LTE CRS configuration of cell 150, but also obtains the LTE CRS configuration of the cells 152, 154 and 156 from the base station 100 in cell 158, the UE 112 is able to perform LTE CRS interference suppression/cancellation in NR downlink (DL) transmission.

Figure 2:
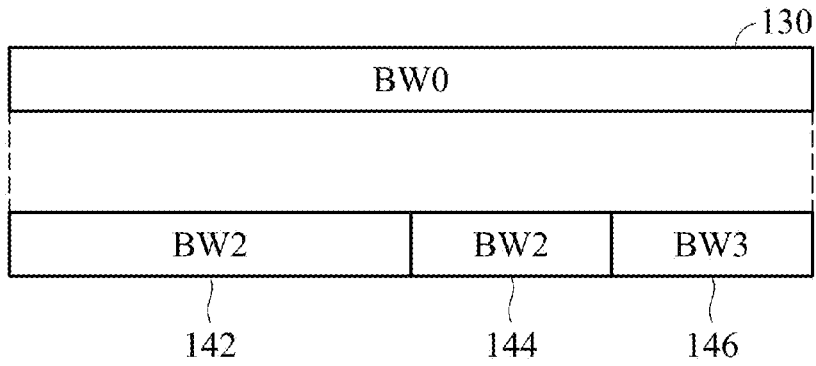
FIG. 2 is a schematic diagram of spectrums of an NR carrier 130 and LTE carriers 142, 144 and 146 in a RRC signal in FIG. 1 in accordance with some embodiments of the disclosure.

FIG. 2 is a schematic diagram of spectrums of an NR carrier 130 and LTE carriers 142, 144 and 146 in a RRC signal in FIG. 1 in accordance with some embodiments of the disclosure. As shown in FIG. 2, when NR coexists with LTE in the same spectrum, the NR carrier 130 has a bandwidth BW0, the LTE carrier 142 has a bandwidth BW1, the LTE carrier 144 has a bandwidth BW2, and the LTE carrier 146 has a bandwidth BW3. In some embodiments, since NR has larger carrier bandwidth compared to LTE carrier, the sum of the bandwidth BW1, the bandwidth BW2, and the bandwidth BW3 may be equal to the bandwidth BW0. For example, in some embodiments, the bandwidth BW0 of the NR carrier 130 may be 50 MHz, the bandwidth BW1 of the LTE carrier 142 may be 20 MHz, the bandwidth BW2 of the LTE carrier 144 may be 15 MHz, and the bandwidth BW3 of the LTE carrier 146 may be 15 MHz, but the present disclosure is not limited thereto. The present disclosure does not limit the number of LTE carriers that can be shared within the bandwidth of an NR carrier.

Figure 3:
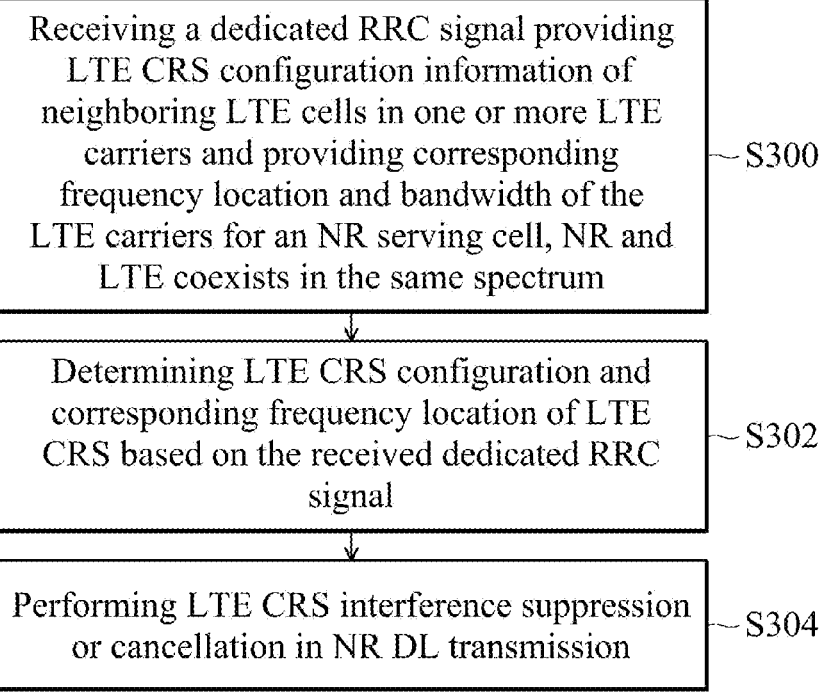
FIG. 3 is a flow chart of a method to mitigate interference for coexistence of OFDM-based radio access technologies in FDD spectrum in accordance with some embodiments of the disclosure.

FIG. 3 is a flow chart of a method to mitigate interference for coexistence of OFDM-based radio access technologies in frequency-division duplex (FDD) spectrum in accordance with some embodiments of the disclosure. Refer to FIG. 1 and FIG. 3 at the same time, the UE 112 in cell 158 receives a dedicated RRC signal from the base station 100. The dedicated RRC signal provides LTE CRS configuration information of neighboring LTE cells (for example, the cells 152, 154, and 156) in one or more LTE carriers (for example, the LTE carriers 142, 144 and 146) and also provides the corresponding frequency location and bandwidth of the LTE carriers for the NR serving cell (for example, cell 158). In other words, the UE 112 performs step S300 in FIG. 3. In step S300, NR and LTE coexist in the same spectrum. After that, the UE 112 determines the LTE CRS configuration and the corresponding frequency location of LTE CRS based on the received dedicated RRC signal (step S302). Then, the UE 112 performs LTE CRS interference suppression or cancellation in NR DL transmission (step S304).

In some embodiments, refer to FIG. 1, FIG. 2 and FIG. 3 at the same time, the dedicated RRC signal received by the UE 112 may include the frequency location of the LTE carrier 142, the bandwidth of the LTE carrier 142, LTE CRS configuration information of cell 152, LTE CRS configuration information of cell 154, and LTE CRS configuration information of cell 156, all of which are carried in the carrier 142 in FIG. 2. Cells 152, 154, and 156 are neighboring cells of cell 158. In some embodiments, the LTE CRS configuration information of cell 152 may include physical-layer cell identification of cell 152, the number of LTE CRS antenna ports incell 152, and the multicast broadcast signal frequency network (MBSFN) sub frame configuration of cell 152. In some embodiments, MBSFN sub frame is a sub frame which includes LTE CRS in first or first 2 OFDM symbols only and no LTE CRS in remaining OFDM symbols.

Similarly, the LTE CRS configuration information of cell 154 may include physical-layer cell identification of cell 154, the number of LTE CRS antenna ports incell 154, and the MBSFN sub frame configuration of cell 154. The LTE CRS configuration information of cell 156 may include physical-layer cell identification of cell 156, the number of LTE CRS antenna ports incell 156, and the multicast broadcast signal frequency network (MBSFN) sub frame configuration of cell 156. For FDD spectrum, the UE 112 is provided with the abovementioned network-assisted information (from the base station 100) on LTE CRS via RRC signaling, so that the UE 112 may determine LTE CRS configuration based on the received network-assisted information for LTE CRS interference suppression/cancellation in NR DL transmission.

In the embodiment of FIG. 3, the dedicated RRC signal received by the UE 112 may also include the frequency location of the LTE carrier 144, the bandwidth of the LTE carrier 144, LTE CRS configuration information of cell 152, LTE CRS configuration information of cell 154, and LTE CRS configuration information of cell 156, all of which are carried in the carrier 144 in FIG. 2. The dedicated RRC signal received by the UE 112 may further include the frequency location of the LTE carrier 146, the bandwidth of the LTE carrier 146, LTE CRS configuration information of cell 152, LTE CRS configuration information of cell 154, and LTE CRS configuration information of cell 156, all of which are carried in the carrier 146 in FIG. 2.

FIG. 4 is a flow chart of a method to mitigate interference for coexistence of OFDM-based radio access technologies in time-division duplex (TDD) spectrum in accordance with some embodiments of the disclosure. Refer to FIG. 1 and FIG. 4 at the same time, the UE 112 in cell 158 receives a dedicated RRC signal from the base station 100. The dedicated RRC signal provides LTE CRS configuration information of neighboring LTE cells (for example, the cells 152, 154, and 156) in one or more LTE carriers (for example, the LTE carriers 142, 144 and 146) and also provides the corresponding frequency location and bandwidth of the LTE carriers for the NR serving cell (for example, cell 158). In other words, the UE 112 performs step S400 in FIG. 4. In step S400, NR and LTE coexist in the same spectrum.

After that, the UE 112 determines the LTE CRS configuration and the corresponding frequency location of LTE CRS based on the received dedicated RRC signal (step S402). Then the UE 112 determines which NR slots have existing LTE CRS based on the semi-static DL and UL configuration and the dynamic DL and UL configuration of the NR serving cell (for example, cell 158) (step S404). In some embodiments, the semi-static DL and UL configuration of the NR serving cell may be in system information and/or in dedicated RRC signal. The dynamic DL and UL configuration of the NR serving cell may be in slot format indication and/or in scheduling information. Finally, the UE 112 performs LTE CRS interference suppression or cancellation in NR DL transmission (step S406), In the embodiment of FIG. 4, the semi-static DL and UL configuration is provided via higher-layer signaling, and the dynamic DL and UL configuration is provided via physical-layer signaling.

In some embodiments, refer to FIG. 1, FIG. 2 and FIG. 4 at the same time, the dedicated RRC signal received by the UE 112 may include the frequency location of the LTE carrier 142, the bandwidth of the LTE carrier 142, LTE CRS configuration information of cell 152, LTE CRS configuration information of cell 154, and LTE CRS configuration information of cell 156, all of which are carried in the carrier 142 in FIG. 2. Cells 152, 154, and 156 are neighboring cells of cell 158. In some embodiments, the LTE CRS configuration information of cell 152 may include physical-layer cell identification of cell 152, the number of LTE CRS antenna ports incell 152, the DL/UL configuration of cell 152, and the MBSFN sub frame configuration of cell 152. In some embodiments, the DL/UL configuration indicates which sub frame is for DL only, which sub frame is for UL only, and which sub frame has a special configuration including DL part, guard period and UL part.

Similarly, the LTE CRS configuration information of cell 154 may include physical-layer cell identification of cell 154, the number of LTE CRS antenna ports incell 154, the DL/UL configuration of cell 154, and the MBSFN sub frame configuration of cell 154. The LTE CRS configuration information of cell 156 may include physical-layer cell identification of cell 156, the number of LTE CRS antenna ports incell 156, the DL/UL configuration of cell 156, and the MBSFN sub frame configuration of cell 156. For the TDD spectrum, the UE 112 is provided with the abovementioned network-assisted information (from the base station 100) on LTE CRS via RRC signaling, so that the UE 112 may determine LTE CRS configuration based on the received network-assisted information and determine which slots have existing LTE CRS based on the semi-static DL/UL configuration and dynamic DL/UL configuration of the NR serving cell (for example, cell 158) for LTE CRS interference suppression/cancellation in NR DL transmission.

In the embodiment of FIG. 4, the dedicated RRC signal received by the UE 112 may also include the frequency location of the LTE carrier 144, the bandwidth of the LTE carrier 144, LTE CRS configuration information of cell 152, LTE CRS configuration information of cell 154, and LTE CRS configuration information of cell 156, all of which are carried in the carrier 144 in FIG. 2. The dedicated RRC signal received by the UE 112 may further include the frequency location of the LTE carrier 146, the bandwidth of the LTE carrier 146, LTE CRS configuration information of cell 152, LTE CRS configuration information of cell 154, and LTE CRS configuration information of cell 156, all of which are carried in the carrier 146 in FIG. 2.

FIG. 5 is a flow chart of a method to mitigate interference for coexistence of OFDM-based radio access technologies in TDD spectrum in accordance with some embodiments of the disclosure. Please refer to FIG. 1 and FIG. 5: The UE 112 in cell 158 receives a dedicated RRC signal from the base station 100. The dedicated RRC signal provides LTE CRS configuration information and DL/UL configurations of neighboring LTE cells (for example, the cells 152, 154, and 156) in one or more LTE carriers (for example, the LTE carriers 142, 144 and 146) and also provides the corresponding frequency location and bandwidth of the LTE carriers for the NR serving cell (for example, cell 158). In other words, the UE 112 performs step S500 in FIG. 5. In step S500, NR and LTE coexist in the same spectrum.

After that, the UE 112 determines the LTE CRS configuration and the corresponding frequency location of LTE CRS based on the received dedicated RRC signal (step S502). Then the UE 112 determines which NR slots have existing LTE CRS based on the semi-static DL and UL configuration and the dynamic DL and UL configuration of the NR serving cell (for example, cell 158) and the DL/UL configurations of the neighboring LTE cells (for example, the cells 152, 154, and 156) in the received network-assisted information in the dedicated RRC signal (step S504). Finally, the UE 112 performs LTE CRS interference suppression or cancellation in NR DL transmission (step S506), In the embodiment of FIG. 5, the semi-static DL and UL configuration is provided via higher-layer signaling, and the dynamic DL and UL configuration is provided via physical-layer signaling.

In some embodiments (please refer to FIG. 1, FIG. 2 and FIG. 5), the dedicated RRC signal received by the UE 112 may include the frequency location of the LTE carrier 142, the bandwidth of the LTE carrier 142, the DL/UL configuration of the LTE carrier 142 (corresponding to cell 152), LTE CRS configuration information of cell 152, LTE CRS configuration information of cell 154, and LTE CRS configuration information of cell 156, all of which are carried in the carrier 142 in FIG. 2. Cells 152, 154, and 156 are neighboring cells of cell 158. In some embodiments, the LTE CRS configuration information of cell 152 may include physical-layer cell identification of cell 152, the number of LTE CRS antenna ports incell 152, and the MBSFN sub frame configuration of cell 152.

Similarly, the LTE CRS configuration information of cell 154 may include physical-layer cell identification of cell 154, the number of LTE CRS antenna ports incell 154, and the MBSFN sub frame configuration of cell 154. The LTE CRS configuration information of cell 156 may include physical-layer cell identification of cell 156, the number of LTE CRS antenna ports incell 156, and the MBSFN sub frame configuration of cell 156. For the TDD spectrum, the UE 112 is provided with the abovementioned network-assisted information (from the base station 100) on LTE CRS via RRC signaling, so that the UE 112 may determine LTE CRS configuration based on the received network-assisted information and determine which slots have existing LTE CRS based on the semi-static DL/UL configuration and dynamic DL/UL configuration of the NR serving cell (for example, cell 158), and the DL/UL configuration(s) of LTE carrier(s) in the received network-assisted information for LTE CRS interference suppression/cancellation in NR DL transmission.

In the embodiment of FIG. 5, the dedicated RRC signal received by the UE 112 may also include the frequency location of the LTE carrier 144, the bandwidth of the LTE carrier 144, the DL/UL configuration of the LTE carrier 144 (corresponding to cell 154), LTE CRS configuration information of cell 152, LTE CRS configuration information of cell 154, and LTE CRS configuration information of cell 156, all of which are carried in the carrier 144 in FIG. 2. The dedicated RRC signal received by the UE 112 may further include the frequency location of the LTE carrier 146, the bandwidth of the LTE carrier 146, the DL/UL configuration of the LTE carrier 146 (corresponding to cell 156), LTE CRS configuration information of cell 152, LTE CRS configuration information of cell 154, and LTE CRS configuration information of cell 156, all of which are carried in the carrier 146 in FIG. 2.

The present disclosure proposes to use over-the-air assistance information from the network to facilitate a UE's performance of interference suppression or cancellation on LTE CRS so as to improve NR throughput when NR coexists with LTE in the same FDD/TDD spectrum. The idea of the present disclosure includes network assistance information for LTE CRS interference/cancellation over NR.

The embodiments of the present disclosure are disclosed above, but they are not used to limit the scope of the present disclosure. A person skilled in the art can make some changes and retouches without departing from the spirit and scope of the embodiments of the present disclosure. Therefore, the scope of protection in the present disclosure shall be deemed as defined by the scope of the attached claims.

The invention claimed is:

1. A method, applied to a UE, to mitigate interference for coexistence of OFDM-based radio access technologies, comprising:

receiving a dedicated radio resource control (RRC) signal providing Long Term Evolution (LTE) cell-specific reference signal (CRS) configuration information of neighboring LTE cells in one or more LTE carriers and providing corresponding frequency location and bandwidth of the LTE carriers for a New Radio (NR) serving cell, wherein NR and LTE coexist in the same spectrum; wherein the NR serving cell comprises a first base station, and the neighboring LTE cells comprises other base stations; wherein the first base station obtains the LTE CRS configuration from the other base stations;

determining LTE CRS configuration and corresponding frequency location of LTE CRS based on the received dedicated RRC signal; and performing LTE CRS interference suppression or cancellation in NR downlink (DL) transmission.

2. The method as claimed in claim 1, wherein the NR DL transmission is achieved by using frequency-division duplex (FDD).

3. The method as claimed in claim 2, wherein the LTE CRS configuration information comprises physical-layer cell identification, number of LTE CRS antenna ports, and multicast broadcast signal frequency network (MBSFN) sub frame configuration.

4. The method as claimed in claim 1, further comprising:

determining which NR slots have existing LTE CRS based on semi-static DL and UL configuration and dynamic DL and UL configuration of the NR serving cell.

5. The method as claimed in claim 4, wherein the semi-static DL and UL configuration is provided via higher-layer signaling, and the dynamic DL and UL configuration is provided via physical-layer signaling.

6. The method as claimed in claim 4, wherein the NR DL transmission is achieved by using time-division duplex (TDD).

7. The method as claimed in claim 6, wherein the LTE CRS configuration information comprises physical-layer cell identification, the number of LTE CRS antenna ports, the MBSFN sub frame configuration, and DL and UL configurations of neighboring LTE cells.

8. The method as claimed in claim 1, further comprising:

receiving the RRC signal providing the DL and UL configuration of each LTE carrier, wherein there are one or more neighboring LTE cells sharing the same DL and UL configuration in each LTE carrier; and determining which NR slots have existing LTE CRS based on the semi-static DL and UL configuration and the dynamic DL and UL configuration of the NR serving cell and the DL and UL configurations of the neighboring LTE cells in received network-assisted information in the RRC signal.

9. The method as claimed in claim 8, wherein the semi-static DL and UL configuration is provided via higher-layer signaling, and the dynamic DL and UL configuration is provided via physical-layer signaling.

10. The method as claimed in claim 8, wherein the NR DL transmission is achieved by using TDD.

11. The method as claimed in claim 10, wherein the LTE CRS configuration information comprises physical-layer cell identification, the number of LTE CRS antenna ports, and the MBSFN sub frame configuration.

* * * * *